US010151283B2

(12) United States Patent
Graichen et al.

(10) Patent No.: US 10,151,283 B2
(45) Date of Patent: Dec. 11, 2018

(54) EVACUATOR WITH MOTIVE FIN

(71) Applicants: Brian M. Graichen, Leonard, MI (US); Keith Hampton, Ann Arbor, MI (US)

(72) Inventors: Brian M. Graichen, Leonard, MI (US); Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 288 days.

(21) Appl. No.: 14/631,287

(22) Filed: Feb. 25, 2015

(65) Prior Publication Data

US 2016/0245236 A1 Aug. 25, 2016

(51) Int. Cl.
| | | |
|---|---|---|
| *F02M 25/07* | (2006.01) | |
| *F02M 35/10* | (2006.01) | |
| *F02M 26/10* | (2016.01) | |
| *F02M 26/04* | (2016.01) | |
| *F04F 5/20* | (2006.01) | |
| *F04F 5/44* | (2006.01) | |
| *F04F 5/46* | (2006.01) | |

(52) U.S. Cl.
CPC ...... *F02M 35/10229* (2013.01); *F02M 26/04* (2016.02); *F02M 26/10* (2016.02); *F04F 5/20* (2013.01); *F04F 5/44* (2013.01); *F04F 5/468* (2013.01); *Y02T 10/146* (2013.01)

(58) Field of Classification Search
CPC ............ F02M 35/10229; Y02T 10/121; F15D 1/0025; F15D 1/003; F15D 1/0035; F15D 1/004
USPC ........................ 123/568.11; 417/67; 137/888
See application file for complete search history.

(56) References Cited

U.S. PATENT DOCUMENTS

| | | | |
|---|---|---|---|
| 139,799 A | 6/1873 | Mack | |
| 166,762 A | 8/1875 | Fowden | |
| 1,845,969 A | 2/1932 | Hueber | |
| 1,902,729 A | 3/1933 | Schmidt | |
| 2,183,561 A * | 12/1939 | Hamblin | ............ A62C 5/024 138/37 |
| 2,319,228 A * | 5/1943 | Harrington | ............ F04D 17/18 417/323 |
| 2,391,734 A | 12/1945 | Nittka | |

(Continued)

FOREIGN PATENT DOCUMENTS

| | | |
|---|---|---|
| CN | 201109426 | 9/2008 |
| CN | 103407441 | 11/2013 |

(Continued)

OTHER PUBLICATIONS

PCT, International Search Report and Written Opinion, PCT/US2014/059672 (dated Jan. 9, 2015).

(Continued)

*Primary Examiner* — Stephen K Cronin
*Assistant Examiner* — Susan Scharpf
(74) *Attorney, Agent, or Firm* — FisherBroyles, LLP; Susan M. Oiler

(57) ABSTRACT

An evacuator is disclosed, and includes a body defining a central axis, a converging motive section, a diverging discharge section, at least one suction port, and at least one Venturi gap. The Venturi gap is located between an outlet end of the converging motive section and an inlet end of the diverging discharge section. The evacuator also includes a fin positioned within the motive section of the body. The fin extends in the direction of the central axis.

20 Claims, 5 Drawing Sheets

(56) References Cited

U.S. PATENT DOCUMENTS

| | | | |
|---|---|---|---|
| 2,396,290 A | 3/1946 | Schwarz | |
| 2,512,479 A | 6/1950 | Callejo | |
| 3,234,932 A | 2/1966 | Bird et al. | |
| 3,430,437 A | 3/1969 | Saussele et al. | |
| 3,467,022 A | 9/1969 | Techler et al. | |
| 3,581,850 A | 6/1971 | Jaitl | |
| 3,636,983 A | 1/1972 | Keyser | |
| 3,754,841 A | 8/1973 | Grabb et al. | |
| 3,826,281 A | 7/1974 | Clark | |
| 4,211,200 A | 7/1980 | Rocchio et al. | |
| 4,308,138 A | 12/1981 | Woltman | |
| 4,499,034 A | 2/1985 | McAllister | |
| 4,519,423 A * | 5/1985 | Ho | B01F 5/045 137/888 |
| 4,554,786 A | 11/1985 | Takeuchi et al. | |
| 4,634,559 A | 1/1987 | Eckert | |
| 4,683,916 A | 8/1987 | Raines | |
| 4,759,691 A | 7/1988 | Kroupa | |
| 4,880,358 A | 11/1989 | Lasto | |
| 4,951,708 A | 8/1990 | Miller | |
| 5,005,550 A * | 4/1991 | Bugin, Jr. | F02M 25/089 123/520 |
| 5,108,266 A | 4/1992 | Hewitt | |
| 5,188,141 A | 2/1993 | Cook et al. | |
| 5,291,916 A | 3/1994 | Kloosterman et al. | |
| 5,584,668 A | 12/1996 | Volkmann | |
| 5,816,446 A | 10/1998 | Steindorf et al. | |
| 6,035,881 A * | 3/2000 | Emmerich | B60T 17/02 137/113 |
| RE37,090 E | 3/2001 | Kloosterman et al. | |
| 6,220,271 B1 | 4/2001 | Emmerich et al. | |
| 6,293,294 B1 * | 9/2001 | Loeb | B01F 5/0405 137/1 |
| 6,308,731 B1 | 10/2001 | Kawasaki | |
| 6,394,760 B1 | 5/2002 | Tell | |
| 6,619,322 B1 | 9/2003 | Wojciechowski et al. | |
| 6,969,052 B2 * | 11/2005 | Korzeniowski | B01F 3/0446 261/76 |
| 7,029,103 B2 | 4/2006 | Iida | |
| 7,353,812 B1 * | 4/2008 | Gosdzinski | F02D 9/1055 123/339.23 |
| 7,610,140 B2 * | 10/2009 | Hirooka | B60T 17/02 123/339.11 |
| 7,628,170 B2 | 12/2009 | Kok-Hiong et al. | |
| 7,722,132 B2 | 5/2010 | Carlsson | |
| 7,784,999 B1 * | 8/2010 | Lott | B01F 5/0413 137/888 |
| 8,517,056 B2 | 8/2013 | Cullin | |
| 8,845,178 B2 * | 9/2014 | Hanada | B01F 3/0865 137/888 |
| 9,827,963 B2 | 11/2017 | Fletcher et al. | |
| 2004/0036185 A1 | 2/2004 | Garcia | |
| 2004/0069353 A1 | 4/2004 | Pickelman | |
| 2004/0113288 A1* | 6/2004 | Korzeniowski | B01F 3/0446 261/76 |
| 2005/0061378 A1 | 3/2005 | Foret | |
| 2005/0121084 A1 | 6/2005 | Andersson | |
| 2005/0172924 A1* | 8/2005 | Simon | F02M 35/10019 123/184.23 |
| 2006/0016477 A1 | 1/2006 | Zaparackas | |
| 2007/0044848 A1 | 3/2007 | Norman | |
| 2007/0071618 A1 | 3/2007 | Rhoads | |
| 2007/0152355 A1* | 7/2007 | Hartley | B01F 5/0413 261/76 |
| 2008/0007113 A1 | 1/2008 | Choi | |
| 2008/0121480 A1 | 5/2008 | Kawamori et al. | |
| 2008/0145238 A1 | 6/2008 | Shibayama et al. | |
| 2009/0056812 A1 | 3/2009 | Mazzei | |
| 2011/0132311 A1 | 6/2011 | Pursifull et al. | |
| 2011/0186151 A1* | 8/2011 | Sparazynski | B60T 17/02 137/526 |
| 2012/0024249 A1 | 2/2012 | Fuhrmann et al. | |
| 2013/0139911 A1 | 6/2013 | Wilson et al. | |
| 2013/0213510 A1 | 8/2013 | Burnham et al. | |
| 2013/0233276 A1 | 9/2013 | Pursifull et al. | |
| 2013/0233287 A1 | 9/2013 | Leone | |
| 2013/0306181 A1* | 11/2013 | Mitchell | F23L 15/04 137/888 |
| 2013/0340732 A1* | 12/2013 | Pursifull | F02M 35/10222 123/572 |
| 2014/0014080 A1 | 1/2014 | Beshay et al. | |
| 2014/0165962 A1 | 6/2014 | Pursifull | |
| 2014/0197345 A1 | 7/2014 | Graichen et al. | |
| 2014/0301157 A1* | 10/2014 | Glanville | B01F 5/0617 366/337 |
| 2014/0360607 A1* | 12/2014 | Fletcher | B60T 13/52 137/888 |
| 2015/0114350 A1 | 4/2015 | Pursifull | |
| 2016/0061160 A1* | 3/2016 | Fletcher | F02M 35/10229 417/159 |

FOREIGN PATENT DOCUMENTS

| | | |
|---|---|---|
| DE | 4310761 | 10/1994 |
| DE | 102004007319 A1 | 8/2005 |
| EP | 2574796 A1 | 4/2013 |
| GB | 2129516 | 5/1984 |
| GB | 2171762 | 9/1986 |
| JP | 2001-295800 | 10/2001 |
| JP | 2007-327453 | 12/2007 |
| WO | 2007/078077 A1 | 7/2007 |
| WO | 2014/096022 A1 | 6/2014 |
| WO | 2014096023 A1 | 6/2014 |

OTHER PUBLICATIONS

PCT, International Search Report and Written Opinion, PCT/US2015/012018 (dated May 8, 2015).
PCT, International Search Report and Written Opinion, PCT/US2015/024195 (dated Jul. 24, 2015).
PCT, International Search Report and Written Opinion, PCT/US2015/033079 (dated Aug. 21, 2015).
PCT, International Search Report and Written Opinion, PCT/US2015/039950 (dated Oct. 5, 2015).
PCT, International Search Report and Written Opinion, PCT/US2015/043911 (dated Nov. 6, 2015).
PCT, International Search Report and Written Opinion, PCT/US2016/019010 (dated May 3, 2016).
CN, Office Action and Search Report with English translation; Chinese Patent Application No. 201410413220.7; (dated Nov. 14, 2016).
PCT, International Search Report and Written Opinion, PCT/US2014/041250 (Oct. 27, 2014).
U.S., Non-Final Office Action; U.S. Appl. No. 14/294,727; (dated Oct. 8, 2015).
U.S., Final Office Action; U.S. Appl. No. 14/294,727; (dated Apr. 22, 2016).
EP, Supplementary European Search Report; Patent Application No. 14811266.7; 5 pages (dated Apr. 5, 2017).
CN, First Office Action and Search Report with English translation; Patent Application No. 2015800003002; 11 pages (dated Apr. 6, 2017).
EP, Supplemental Search Report; European Application No. 15835849.9 (dated Feb. 6, 2018).
EP, Supplemental Search Report; European Application No. 15818552.0 (dated Mar. 7, 2018).
U.S., Office Action; U.S. Appl. No. 14/830,864 (dated Aug. 10, 2017).
U.S., Office Action; U.S. Appl. No. 14/796,447 (dated Dec. 26, 2017).
CN, Third Office Action with English Translation; Chinese Application No. 201410413220.7 (dated Jan. 3, 2018).
JP, Non-Final Office Action with English Translation; Japanese Application No. 2016-519556 (dated May 18, 2018).
EP, Supplemental Search Report; European Application No. 15830300.8 (dated May 29, 0218).
U.S., First Office Action; U.S. Appl. No. 15/791,561 (dated Jul. 26, 2018).

(56) References Cited

OTHER PUBLICATIONS

U.S., Final Office Action; U.S. Appl. No. 14/796,447 (dated May 11, 2018).
EP, European Supplemental Search Report; European Application No. 16756137.2 (dated Jul. 27, 2018).
U.S., Non-Final Office Action, U.S. Appl. No. 14/830,864 (dated Jan. 24, 2018).
U.S., Non-Final Office Action, U.S. Appl. No. 14/830,864 (dated Jul. 26, 2018).
JP, Office Action with English Translation; Japanese Application No. 2017-506350 (dated Sep. 12, 2018).
U.S., Non-Final Office Action; U.S. Appl. No. 14/796,447 (dated Sep. 10, 2018.

* cited by examiner

EVACUATOR WITH MOTIVE FIN

TECHNICAL FIELD

This application relates to vacuum creation by an evacuator and, more particularly, to an evacuator including a fin extending through the motive passageway.

BACKGROUND

In some vehicles vacuum is used to operate or assist in the operation of various devices. For example, vacuum may be used to assist a driver applying vehicle brakes, turbocharger operation, fuel vapor purging, heating and ventilation system actuation, and driveline component actuation. If the vehicle does not produce vacuum naturally, such as from the intake manifold, then a separate vacuum source is required to operate such devices.

In boosted engines where intake manifold pressures are often at pressures greater than atmospheric pressure, intake manifold vacuum may be replaced or augmented with vacuum from an evacuator. Specifically, in one approach the evacuator may include an ejector. The ejector, as used herein, is a converging, diverging nozzle assembly with three connections, a motive port connected to a pressure source above atmospheric pressure, a discharge port connected to atmospheric pressure, and a suction port connected to a device requiring vacuum. By passing pressurized air through the ejector, a low pressure region may be created within the ejector so that air can be drawn from a vacuum reservoir or may directly act on a device requiring vacuum, thereby reducing pressure within the vacuum reservoir or device requiring vacuum.

In another approach the evacuator may include an aspirator. As used herein, the aspirator is a converging, diverging nozzle assembly with three connections, a motive port connected to the intake air at atmospheric pressure, a discharge port connected to the manifold vacuum located downstream of the throttle, and a suction port connected to a device requiring vacuum. Similar to the ejector, a low pressure region may be created within the aspirator so that air can be drawn from a vacuum reservoir or may directly act on a device requiring vacuum, thereby reducing pressure within the vacuum reservoir or device requiring vacuum. There is a continuing need in the art for improved evacuators that generate increased vacuum pressure and increased suction mass flow rate while decreasing the consumption of engine air.

SUMMARY

In one aspect, an evacuator is disclosed. The evacuator includes a body defining a central axis, a first tapering portion, a second tapering portion, at least one suction port, and at least one Venturi gap located between an outlet end of the first tapering portion and an inlet end of the second tapering portion. A fin is positioned within the first tapering portion of the body that extends in the direction of the central axis.

In another aspect, a turbocharged engine air system is disclosed. The turbocharged engine air system includes a device requiring vacuum, a turbocharger having a compressor fluidly connected to an intake manifold of an engine an evacuator defining a motive section, a discharge section, and a suction port. The evacuator includes a Venturi gap positioned between an outlet end of the motive section and an inlet end of the discharge section, where the Venturi gap is in fluid communication with the suction port. The discharge section of the evacuator is fluidly connected to the intake manifold of the engine at a location downstream of the compressor, and the suction port of the evacuator is fluidly connected to the device requiring vacuum. A fin is positioned within the motive section of the evacuator that extends along a length of the motive section.

In another aspect, a normally-aspirated engine air system is disclosed. The normally-aspirated engine air system includes a device requiring vacuum an intake manifold of an engine an evacuator defining a motive section, a discharge section, and a suction port. The evacuator includes a Venturi gap positioned between an outlet end of the motive section and an inlet end of the discharge section, where the Venturi gap is in fluid communication with the suction port. The discharge section of the evacuator is fluidly connected to the intake manifold of the engine at a location downstream of the compressor, and the suction port of the evacuator is fluidly connected to the device requiring vacuum. A fin is positioned within the motive section of the evacuator that extends along a length of the motive section.

Other aspects of the invention will be readily apparent in view of the descriptions and examples presented herein.

DETAILED DESCRIPTION

Figure 1:
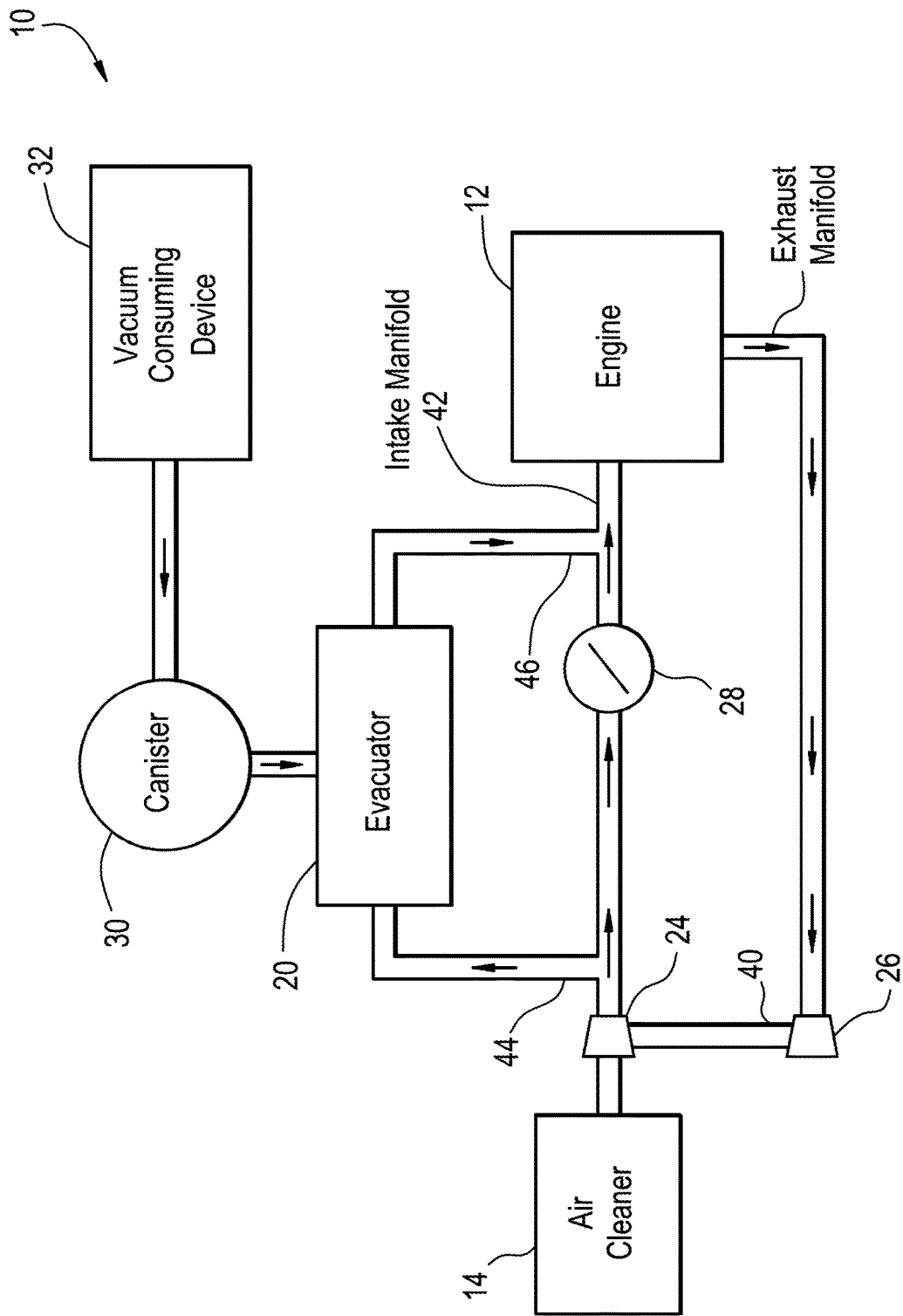
FIG. 1 is a schematic diagram including flow paths and flow directions of one embodiment of an internal combustion engine turbo system including an evacuator.

The following detailed description will illustrate the general principles of the invention, examples of which are additionally illustrated in the accompanying drawings. In the drawings, like reference numbers indicate identical or functionally similar elements. As used herein, the term fluid may include any liquid, suspension, colloid, gas, plasma, or combinations thereof.

Referring now to FIG. 1, an exemplary turbocharged engine air system 10 for providing vacuum to a vehicle vacuum system is disclosed. The engine air system 10 may include an internal combustion engine 12, an air cleaner 14, an evacuator 20, a compressor 24, a turbine 26, a throttle 28, a vacuum reservoir or canister 30, and a vacuum consuming device 32. The internal combustion engine 12 may be, for example, a spark ignited (SI) engine or a compression ignition (CI) engine. In one embodiment, the internal combustion engine 12 may be included in an electric motor/ battery system that is part of a hybrid vehicle. The throttle 28 may be located downstream of the air cleaner 14 and the compressor 24, and upstream of an intake manifold 42 of the internal combustion engine 12.

In the non-limiting embodiment as shown in FIG. 1, the internal combustion engine 12 is boosted. This means that the compressor 24 and turbine 26 may be part of a turbocharger for improving the power output and overall efficiency of the internal combustion engine 12. The turbine 26 may include a turbine wheel (not illustrated in FIG. 1) that harnesses and converts exhaust energy into mechanical work through a common shaft 40 to turn a compressor wheel (not illustrated in FIG. 1) of the compressor 24. The compressor wheel ingests, compresses, and feeds air at elevated operating pressures into the intake manifold 42 of the internal combustion engine 12. Although FIGS. 1 and 2 illustrate a boosted engine, it is to be understood that the disclosed evacuator 20 may be used in a normally-aspirated or non-boosted engine system as well.

The vacuum canister 30 may be supplied vacuum from the evacuator 20. In the embodiment as shown in FIG. 1, the evacuator 20 is supplied clean air from the compressor 24. Specifically, clean air at atmospheric pressure exits the air cleaner 14 and may be compressed by the compressor 24 before passing through the evacuator 20. As explained in greater detail below, the evacuator 20 may be used to supply vacuum to the vacuum canister 30. It is to be understood that although FIG. 1 illustrates the evacuator 20 being supplied air from the compressor 24, in another embodiment, the evacuator 20 may be positioned to receive air from the air cleaner 14 as well, for example in the case of a normally-aspirated or non-boosted engine system.

The throttle 28 may be opened as an operator depresses upon an accelerator pedal (not shown). When the throttle 28 is opened, compressed air from the compressor 24 is free to fill the intake manifold 42 of the internal combustion engine 12, thereby increasing the pressure at the intake manifold 42. Those skilled in the art will appreciate that the throttle 28 may be positioned in a plurality of partially opened positions based on the amount of depression of the accelerator (not shown). Since the engine air system 10 is turbocharged, the pressure at the intake manifold 42 may increase to a pressure that is above atmosphere as the throttle 28 is opened.

Figure 2:
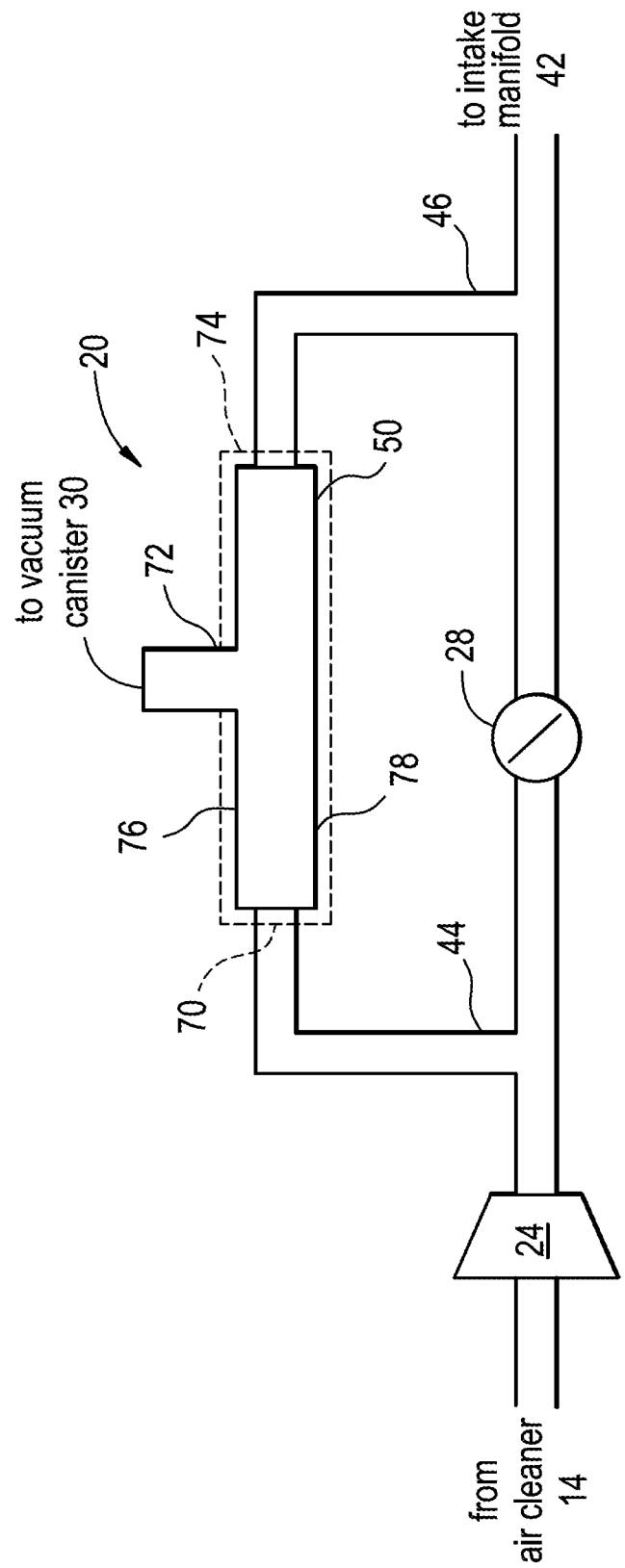
FIG. 2 is a schematic view of the evacuator shown in FIG. 1.

The evacuator 20 may include a first engine air connection 44, a second engine air connection 46, and a pneumatically-actuated vacuum pump 50 (shown in FIG. 2). The first engine air connection 44 of the evacuator 20 may be fluidly connected to the engine air system 10 at a location downstream of the compressor 24 and upstream of the throttle 28. The second engine air connection 46 of the evacuator 20 may be fluidly connected to the engine air system 10 at a location upstream of the intake manifold 42 and downstream of the throttle 28. Although the evacuator 20 is illustrated as supplying vacuum to the vacuum canister 30, those skilled in the art will appreciate that in an alternative embodiment, the evacuator 20 may directly supply vacuum to the vacuum consuming device 32.

The vacuum consuming device 32 may be a device requiring vacuum, such as a brake booster. In an embodiment, the vacuum consuming device 32 may also include additional vacuum consumers as well, such as, for example, turbocharger waste gate actuators, heating and ventilation actuators, driveline actuators (e.g., four wheel drive actuators), fuel vapor purging systems, engine crankcase ventilation, and fuel system leak testing systems.

FIG. 2 is a schematic diagram of an embodiment of the evacuator 20 shown in FIG. 1, and illustrates the pneumatically-actuated vacuum pump 50. Referring to FIGS. 1-2, as used herein, the pneumatically-actuated vacuum pump 50 may be a converging, diverging nozzle assembly with three or more connections. The pneumatically-actuated vacuum pump 50 may include a motive port 70 fluidly connected to the first engine air connection 44, a discharge port 74 fluidly connected to the second engine air connection 46, and one or more suction ports 72 fluidly connected to the vacuum canister 30 (FIG. 1) or to one or more devices requiring vacuum 32. Specifically, the motive port 70 of the evacuator 50 may be fluidly connected to the engine air system 10 downstream of the compressor 24, and the discharge port 74 may be fluidly connected to the engine air system 10 upstream of the intake manifold 42. Those skilled in the art will readily appreciate that although FIG. 2 illustrates one suction ports 72 it is to be understood that the pneumatically-actuated vacuum pump 50 may include additional suction port(s) 72.

In the embodiment as shown in FIG. 2, the pneumatically-actuated vacuum pump 50 may act as an ejector, where boosted air that is above atmospheric pressure may be fed to the evacuator 20 through the motive port 70. However, those skilled in the art will readily appreciate that in an alternative embodiment, the motive port 70 of the pneumatically-actuated vacuum pump 50 may be fluidly connected to a source of air that is at atmospheric pressure such that the pneumatically-actuated vacuum pump 50 acts as an aspirator.

Figure 3:
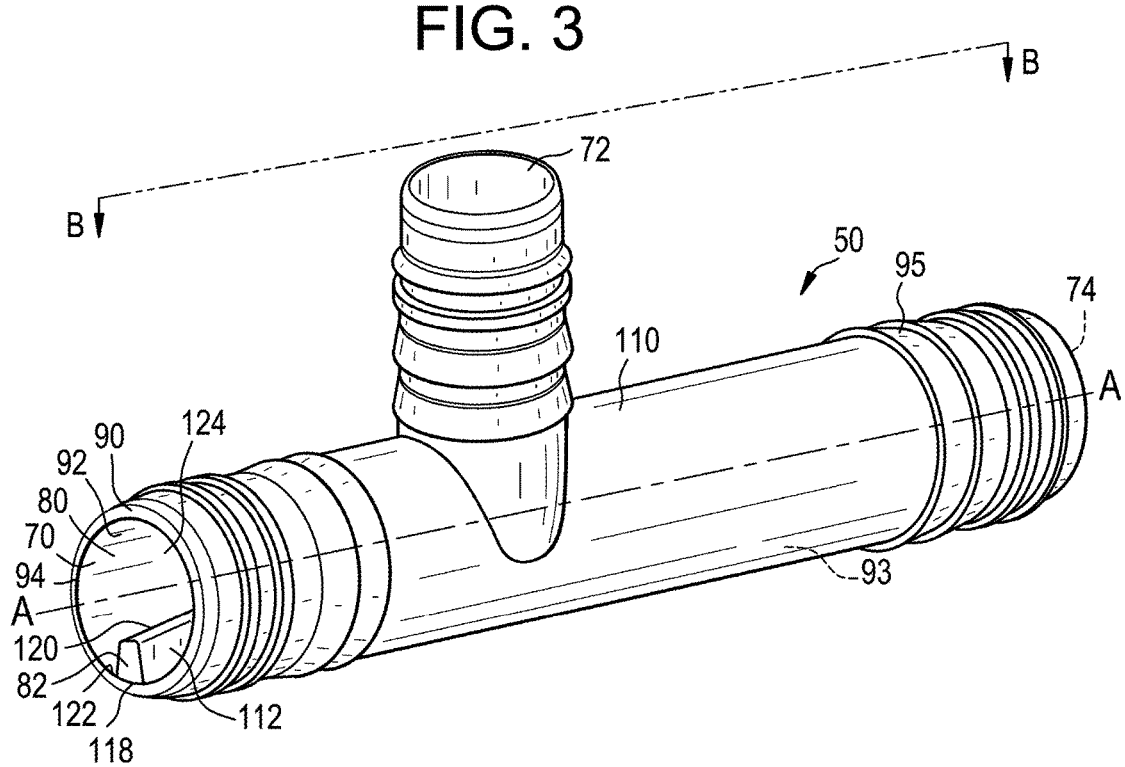
FIG. 3 is a side perspective view of one embodiment of the evacuator of FIG. 2.
Figure 4:
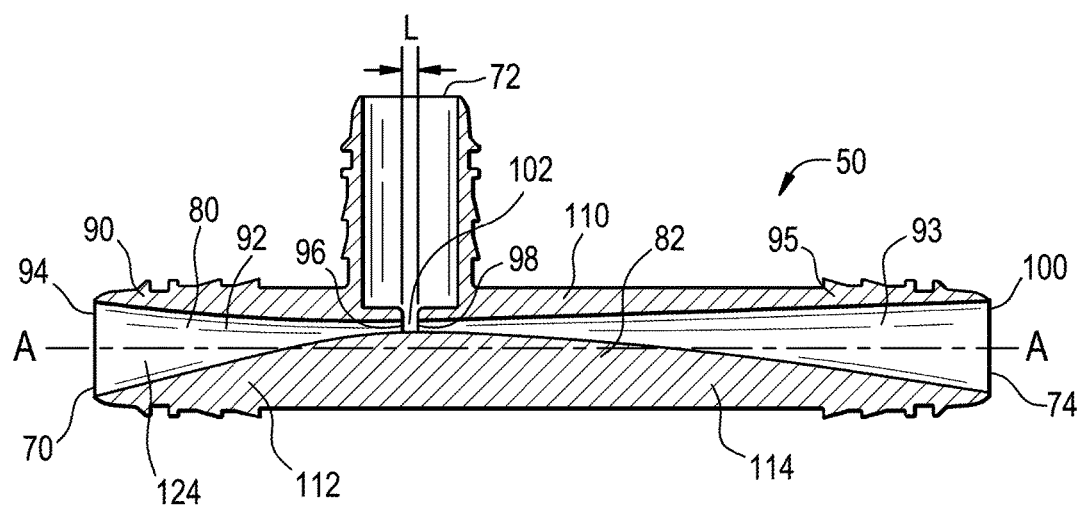
FIG. 4 is a cross-sectional side view of the pneumatically-actuated vacuum pump of FIG. 3, taken along section line B-B in FIG. 3.
Figure 5:
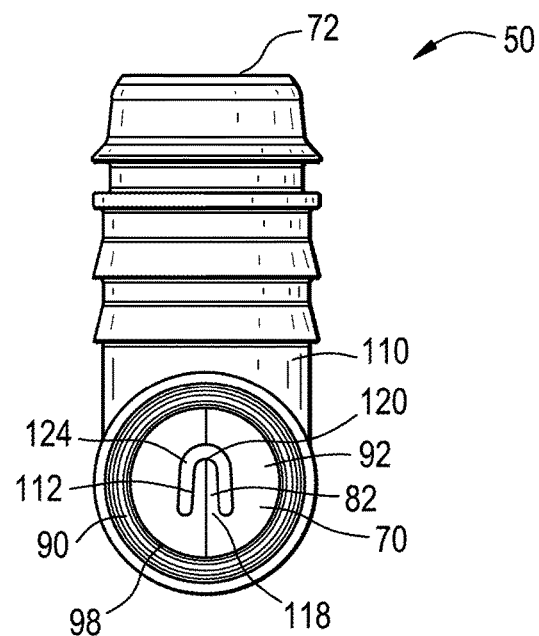
FIG. 5 is an end view of the evacuator of FIG. 3 when viewed from the motive port.

Referring to FIGS. 3-5, an embodiment of the pneumatically-actuated vacuum pump 50 is shown. FIG. 3 is a perspective view, FIG. 4 is a side cross-sectional view taken along line B-B of FIG. 3, and FIG. 5 is an end view from the perspective of the motive port 70. A passageway 80 that extends along axis A-A of the pneumatically-actuated vacuum pump 50 may include a first tapering portion 92 (also referred to as a motive cone) in a motive section 90 of the passageway 80. The passageway 80 may also include a second tapering portion 93 (also referred to as a discharge cone) in a discharge section 95 of the passageway 80. The first tapering portion 92 of the passageway 80 may include an inlet end 94 and an outlet end 96. Similarly, the second tapering portion 93 of the passageway 80 may also include an inlet end 98 and an outlet end 100.

As seen in FIG. 4, the first tapering portion 92 of the pneumatically-actuated vacuum pump 50 may be fluidly coupled to the second tapering portion 93 by a Venturi gap 102. The Venturi gap 102 may be a fluid junction that places the suction port 72 in fluid communication with the motive section 90 and the discharge section 95 of the pneumatically-actuated vacuum pump 50. The Venturi gap 102 may be the lineal distance L measured between the outlet end 96 of the first tapering portion 92 and the inlet end 98 of the second tapering portion 93. The inlet ends 94, 98 and the outlet ends 96, 100 may include any type of profile, such as, but not limited to, a circular shape, an ellipse shape, or another curved or polygonal form. Moreover, the gradually, continuously tapering inner diameter extending from inlet ends 94, 98 and the outlet ends 96, 100 of the passageway 80 may define a hyperboloid, a paraboloid, or a cone. Some exemplary configurations for the outlet end 96 of the first tapering portion 92 and the inlet end 98 of the second tapering portion 93 are presented in FIGS. 4-6 of co-pending U.S. patent application Ser. No. 14/294,727, filed on Jun. 3, 2014, which is incorporated by reference herein in its entirety. A plurality of additional Venturi gaps (not shown) may be located downstream of the Venturi gap 102, along the second tapering portion 93 of the pneumatically-actuated vacuum pump 50. Some exemplary configurations of a pneumatically-actuated vacuum pump with a plurality of Venturi gaps are presented in FIGS. 2-5C of co-pending U.S. patent application Ser. No. 14/452,651, filed on Aug. 6, 2014, which is incorporated by reference herein in its entirety.

Referring now to FIGS. 3-6, the pneumatically-actuated vacuum pump 50 may include a fin 82 that is substantially aligned with a central axis of symmetry A-A of the pneumatically-actuated vacuum pump 50. The fin 82 may be used to reduce the motive flow rate required by the evacuator 20 in order to produce a specific amount of vacuum that is supplied to the vacuum canister 30. The fin 82 also can increase the perimeter area between the motive flow and the suction flow, increasing suction flow. The fin 82 may be rigid structure integrally formed into a housing 110 of the pneumatically actuated vacuum pump 50, for example as part of an injection molding process. The fin 82 may alternately be permanently attached to the housing 100 of the pneumatically-actuated vacuum pump 50. The integral or permanent attachment of the fin 82 to the housing 110 of the pump 50 provides stability to the fin 82 in use, substantially preventing or minimizing vibration of the fin 82, which could otherwise increase turbulence and/or noise. The fin 82 may function similarly to a fletch insert, as disclosed and described in U.S. Provisional Pat. App. No. 62/042,569, filed Aug. 27, 2014, the entirety of which is hereby incorporated by reference herein.

The fin 82 may include a first portion 112 disposed within the first tapering portion 92 of the pneumatically-actuated vacuum pump 50 and a second portion 114 disposed within the second tapering portion 93 of the pump 50. The fin 82 extends radially inwardly towards the axis of symmetry A-A from an inner surface 122 of the tapering portions 92, 93, into a void 124 defined by the passageway 80. The fin 82 extends radially into the void 124 from a base 118 of the fin 82 to terminate in an upper surface 120 thereof. The base 118 extends through the passageway 80 coextensively with the inner surface 122 in the direction of the axis of symmetry A-A. The fin 82 may have a non-uniform height along its length, and in one embodiment, generally increase in height through the first tapering portion 92 and generally decrease in height through the second tapering portion 93. In the depicted embodiment, the fin 82 has a rounded, trapezoidal cross-sectional shape (seen in FIGS. 3 and 5). However, those skilled in the art should appreciate that the fin 82 is not limited as such, but may have, for example, a cross-sectional shape that is substantially semi-elliptical, semi-circular, or any of a variety of curved or polygonal shapes, depending on the motive flow characteristics required for the particular application of the pneumatically-actuated vacuum pump 50.

As shown in FIG. 4, in one embodiment, the fin 82 extends continuously from the inlet end 94 of the first tapering portion 92, through the Venturi gap 102, and on to the outlet end 100 of the second tapering portion 93. The fin 82 may gradually increase in height through the first tapering portion 92 to a maximum height at or near the Venturi gap 102, and then gradually decrease in height through the second tapering portion 93. The fin 82 may extend along substantially the entire distance between the outlet ends 96, 100 (as shown in FIG. 4), or alternately begin/terminate at intermediate location(s) within the length of the passageway 80.

The fin 82 may provide various advantages and benefits during operation of the pneumatically-actuated vacuum pump 50. The fin 82 may decrease the amount of motive flow or air flow required by the pneumatically-actuated vacuum pump 50 in order to generate a specific amount of suction. This means that the pneumatically-actuated vacuum pump 50 requires less air flow than an evacuator that does not include a fin 82 in order to create the same amount of vacuum. As seen in FIG. 5, the fin 82 fills up or blocks off a portion of the void 124 located within the passageway 80 of the pneumatically-actuated vacuum pump 50. The motive flow entering the pneumatically-actuated vacuum pump 50 has a smaller volume to fill in the passageway 80 of the pump 50, as compared to an evacuator of the same dimensions, but lacking the fin 82. Thus, less air is required to enter the motive port 70 (see FIG. 3) of the pneumatically-actuated vacuum pump 50 in order to generate the same amount of suction in the vacuum canister 30, as compared to an evacuator that does not include a fin.

Figure 6:
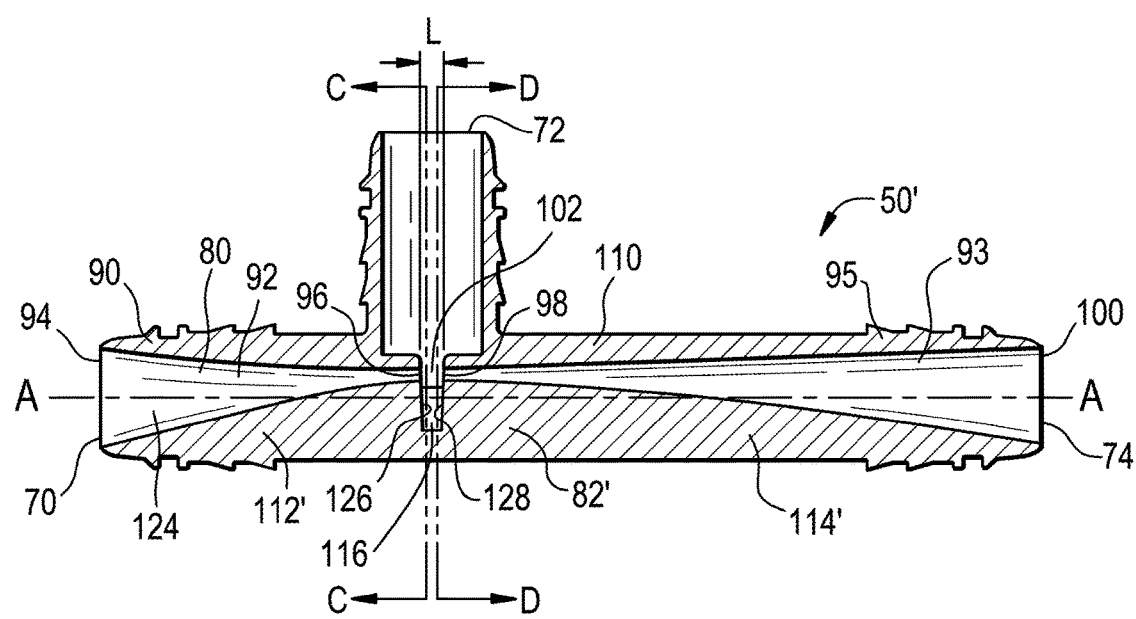
FIG. 6 is cross-sectional side view of another embodiment of the evacuator of FIG. 2.
Figure 7:
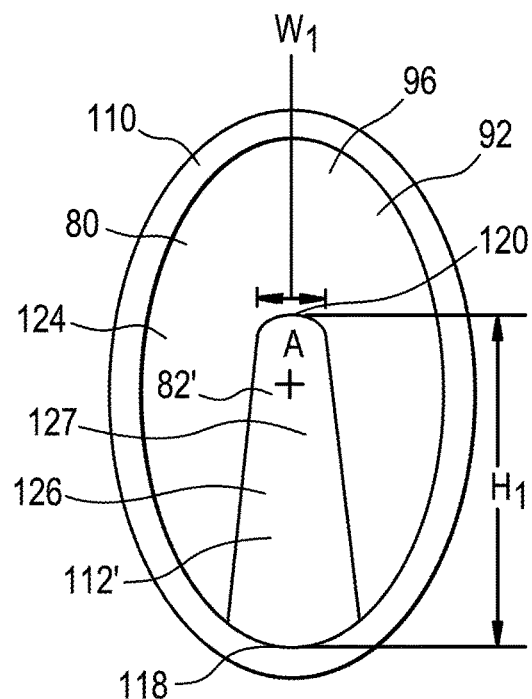
FIG. 7 is an illustrative representation of a cross-sectional view of the evacuator of FIG. 6 taken along section line C-C in FIG. 6, showing an outlet end of a first tapering portion of the evacuator.
Figure 8:
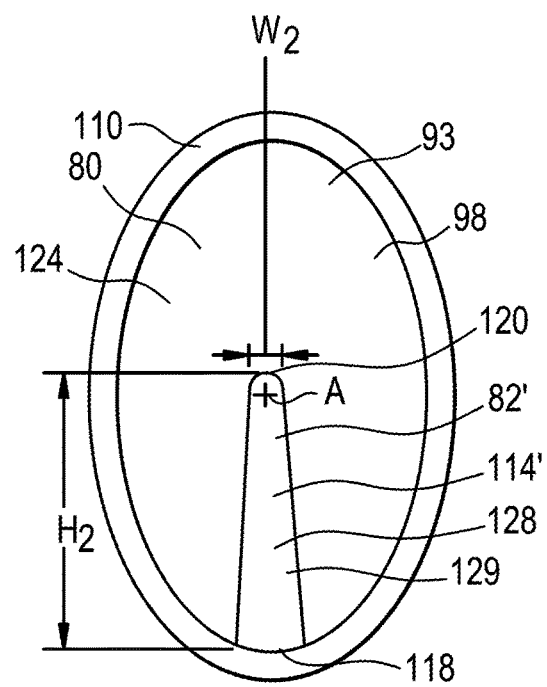
FIG. 8 is an illustrative representation of a cross-sectional view of the evacuator of FIG. 6 taken along section line D-D in FIG. 6, showing an inlet end of a second tapering portion of the evacuator.

FIGS. 6-8, depict an alternative embodiment of a pneumatically-actuated vacuum pump 50', in which a fin 82' does not extend through the Venturi gap 102. In this embodiment, there is a gap 116 located between a first portion 112' and a second portion 114' of the fin 82', where each portion 112', 114' is a separate fin segment. As shown in FIGS. 7 and 8, which are cross-sectional views of the passageway 80 taken at the Venturi gap 102 along lines C-C and D-D of FIG. 6 showing the outlet end 96 of the first tapering portion 92 and the inlet end 98 of the second tapering portion 93, each of the portions 112', 114' of the fin 82' terminates in an end 126, 128 at or near the Venturi gap 102. Each end 126, 128 has a face 127, 129 oriented toward the Venturi gap 102. The faces 127, 129 (or a plane defined by either face 127, 129) may orthogonally or obliquely intersect the axis of symmetry A-A. The face 127 of the first portion 112' and the face 129 of the second portion 114' may be generally aligned across the Venturi gap 102. For example, if both of the faces 127, 129 are the same size and shape (in cross-section), the ends 126, 128 may be substantially identically positioned within their respective tapering portions 92, 93 relative to the axis of symmetry A-A, such that the face 127 of the first portion 112' would substantially coincide with the face 129 of the second portion 114' if one of the ends 126, 128 were extended linearly across the Venturi gap 102. If the faces 127, 129 are not the same size and/or shape, the ends 126, 128 may nonetheless be generally aligned if each end 126, 128 is positioned within its respective tapering portions 92, 93 to maximize symmetrical positioning of the faces 127, 129 relative to each other across the Venturi gap 102. For example, FIGS. 7 and 8 show faces 127, 129 with the generally the same shape but of different sizes, where both are generally aligned through centered placement of the portions 112', 114' within the tapering portions 92, 93.

The faces 126, 128 of the portions 112', 114' of the fin 82' influence the interior perimeter shapes/profiles of the outlet end 96 of the first tapering portion 92 and the inlet end 98 of the second tapering portion 93. In the depicted embodiment, the interior perimeter shapes of both ends 96, 98, including the fin 82', are generally horseshoe-shaped (i.e., the cross-sectional shape of the void 124 of the passageway 80 at or near each of the ends 96, 98 is generally horseshoe-shaped). However, it is to be understood that this illustration is merely exemplary, and the interior perimeter shape of the ends 96, 98 may include other profiles as well. In one embodiment, the height $H_1$ and/or width $W_1$ of the portion 112' of fin 82' at the Venturi gap 102 is greater than the height $H_2$ and/or width $W_2$ of the portion 114' of fin 82' at the Venturi gap 102. In an alternate embodiment, the width of the fin 82' tapers as the fin 82' approaches the Venturi gap 102 (on one or both ends 126, 128), such that the faces 127, 129 are substantially thinner than depicted in FIGS. 7 and 8 (for example, almost linear, in one embodiment).

In a further alternate embodiment (not shown), the fin 82' may include only the first portion 112' through the first tapering portion 92, and omits the second portion 114' in the second tapering portion 93.

Continuing to refer to FIGS. 6-8, in addition to improving efficiency through reducing the motive flow required to generate the requisite amount of suction, the fin 82' provides further opportunities to fine tune the desired suction flow rate and depth of vacuum of the pump 50', based on the relationship between the shapes, size, and positioning of the faces 127, 129 of the fin 82' on either side of the Venturi gap 102. In addition to the lineal distance L between the outlet end 96 of the first tapering portion 92 and the inlet end 98 of the second tapering portion 93, the perimeter shape of the outlet end 96 also impacts the suction flow rate. Specifically, a larger perimeter results in increased suction flow. Also, the magnitude of the offset (i.e., the degree to which the area of the inlet end 98 is larger than the area of the outlet end 96) impacts both the suction flow rate and the depth of vacuum generated. These relationships are described in U.S. patent application Ser. No. 14/294,727, filed Jun. 3, 2014, and U.S. Provisional Pat. App. No. 62/042,568, filed Aug. 27, 2014, each of which is hereby incorporated by reference in its entirety.

Fin 82' provides enhanced options for both maximizing suction flow rate and increasing the depth of vacuum. Referring to FIGS. 7 and 8, with respect to suction flow rate, the shape of the face 127 at the end 126 of first portion 112' of the fin 82' substantially increases the total internal perimeter of the outlet end 96 (as shown, defining a generally horseshoe shaped void), as compared to an outlet end for a similarly-sized first tapered portion 92 without a fin 82', which would be generally elliptical in shape. Accordingly, the potential suction flow rate of the pump 50' across a Venturi gap 102 is substantially increased as compared to an identical pump lacking a fin 82'. Further, to adjust the suction flow capabilities between applications (for example, to modify the design of the pump 50' for a different application), it may be possible to change the shape and/or size of the fin 82' alone, without the need to change the shape or size of the passageway 80 in other respects, such as by changing the shape or size of the first tapering portion 92.

Still referring to FIGS. 7 and 8, the fin 82' also expands the design options for controlling depth of vacuum parameters for the pump 50'. Depth of vacuum is a function of the magnitude of the offset between the inlet end 98 and the outlet end 96 of the Venturi gap 102. The smaller the offset, the greater the depth of vacuum. Accordingly, in addition to (or instead of) varying the shape and/or size of the overall perimeter shapes of the ends 96, 98 aside from the fin 82' (in other words, the overarching elliptical shape, in the example of FIGS. 7 and 8), offset of the pump 50' can be adjusted by varying the size and/or changing the shape of the face 128 of the second portion 114' of the fin 82' at the inlet end 98. For example offset can be increased by reducing the height $H_2$ and/or width $W_2$ of the face 128 on the inlet end 98 relative to the height $H_1$ and/or width $W_1$ of the face 126 of the outlet end 126. Accordingly, the shape and size of the first and second portions 112', 114' of the fin 82' can be optimized relative to each other, to set the suction flow rate and the depth of vacuum characteristics of the pump 50' according to the required performance criteria.

The embodiments of this invention shown in the drawings and described above are exemplary of numerous embodiments that may be made within the scope of the appended claims. It is contemplated that numerous other configurations of the disclosure may be created taking advantage of the disclosed approach. In short, it is the applicants' intention that the scope of the patent issuing herefrom will be limited only by the scope of the appended claims.

What is claimed is:

1. An evacuator, comprising:
    a body defining a central axis, a first tapering portion and a second tapering portion defining a passageway through the body, at least one Venturi gap located between an outlet end of the first tapering portion and an inlet end of the second tapering portion, and a suction port in fluid communication with the Venturi gap, wherein the outlet end of the first tapering portion defines an elliptically-shaped first opening into the at least one Venturi gap; and
    a single fin protruding inward into the passageway and extending in the direction of the central axis with a length from a starting point at the inlet end of the first tapering portion or an intermediate position within the first tapering portion to an ending point at the outlet end of the second tapering portion or an intermediate position within the second tapering portion;
    wherein the fin is either continuous through the Venturi gap or discontinuous at the Venturi gap.

2. The evacuator of claim 1, wherein the fin is discontinuous at the Venturi gap and defines a first face at the outlet end of the first tapering portion and a second face at the inlet end of the second tapering portion; and wherein a perimeter length of the second face is greater than a perimeter of the first face.

3. The evacuator of claim 2, wherein the inlet end of the second tapering portion defines an elliptically-shaped opening, and the fin has a generally semi-elliptical or semi-circular shape as a cross-sectional shape thereof.

4. The evacuator of claim 3, wherein the cross-sectional shape of a second portion of the fin in the second tapering portion has a larger height and or width than a first portion of the fin in the first tapering portion.

5. The evacuator of claim 1, wherein the fin is integral with the body.

6. The evacuator of claim 1, wherein the fin has a variable height along a length of the fin.

7. The evacuator of claim 6, wherein the fin has a maximum height proximate to the Venturi gap.

8. The evacuator of claim 1, wherein the first tapering portion is a converging motive portion and wherein the second tapering portion is a diverging discharge portion.

9. The evacuator of claim 1, wherein a height of the fin gradually increases through the first tapering portion to a maximum height at or proximate the Venturi gap.

10. The evacuator of claim 9, wherein the height of the fin gradually decreases through the second tapering portion.

11. The evacuator of claim 9, wherein the fin has a generally semi-elliptical or semi-circular shape as a cross-sectional shape thereof.

12. The evacuator of claim 1, wherein the inlet end of the second tapering portion defines an elliptically-shaped second opening at the Venturi gap.

13. The evacuator of claim 1, wherein the fin has a generally semi-elliptical or semi-circular shape as a cross-sectional shape thereof.

14. A turbocharged engine air system, comprising:
    a device requiring vacuum;
    a turbocharger having a compressor fluidly connected to an intake manifold of an engine; and an evacuator defining a motive section having an elliptically-shaped motive outlet, a discharge section, and a suction port, the evacuator including a Venturi gap positioned between the elliptically-shaped motive outlet and an inlet end of the discharge section, the Venturi gap in fluid communication with the suction port, wherein the discharge section of the evacuator is fluidly connected to the intake manifold of the engine at a location downstream of the compressor, and the suction port of the evacuator is fluidly connected to the device requiring vacuum; and a single fin protruding inward into the passageway and having a length from a starting point at the inlet end of the first tapering portion or an intermediate location within the first tapering portion to an ending point at the outlet end of the second tapering portion or an intermediate location within the second tapering portion;

wherein the fin is either continuous through the Venturi gap or discontinuous at the Venturi gap.

15. The turbocharged engine air system of claim 14, wherein the fin is integral with the motive section of the evacuator.

16. The turbocharged engine air system of claim 14, wherein a height of the fin gradually increases through the first tapering portion to a maximum height at or proximate the Venturi gap.

17. The evacuator of claim 14, wherein the fin has a generally semi-elliptical or semi-circular shape as a cross-sectional shape thereof.

18. A non-boosted engine air system, comprising:
a device requiring vacuum;
an intake manifold of an engine; and
an evacuator defining a motive section having an elliptically-shaped motive outlet, a discharge section, and a suction port, the evacuator including a Venturi gap positioned between the elliptically-shaped motive outlet and an inlet end of the discharge section, the Venturi gap in fluid communication with the suction port, wherein the discharge section of the evacuator is fluidly connected to the intake manifold of the engine at a location downstream of the throttle, and the suction port of the evacuator is fluidly connected to the device requiring vacuum; and a single fin protruding inward into the passageway and extending from having a length from a starting point at the inlet end of the first tapering portion or an intermediate location within the first tapering portion to an ending point at the outlet end of the second tapering portion or an intermediate location within the second tapering portion;

wherein the fin is either continuous through the Venturi gap or discontinuous at the Venturi gap.

19. The non-boosted engine air system of claim 18, wherein the fin is integral with the motive section of the evacuator.

20. The evacuator of claim 18, wherein the fin has a generally semi-elliptical or semi-circular shape as a cross-sectional shape thereof.

* * * * *